(12) United States Patent
Troni-Peralta et al.

(10) Patent No.: US 9,417,091 B2
(45) Date of Patent: Aug. 16, 2016

(54) SYSTEM AND METHOD FOR DETERMINING AND CORRECTING FIELD SENSORS ERRORS

(71) Applicants: Giancarlo Troni-Peralta, Baltimore, MD (US); Louis L. Whitcomb, Baltimore, MD (US)

(72) Inventors: Giancarlo Troni-Peralta, Baltimore, MD (US); Louis L. Whitcomb, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 631 days.

(21) Appl. No.: 13/892,873

(22) Filed: May 13, 2013

(65) Prior Publication Data

US 2014/0336970 A1 Nov. 13, 2014

(51) Int. Cl.
*G01C 25/00* (2006.01)

(52) U.S. Cl.
CPC .............. *G01C 25/00* (2013.01); *G01C 25/005* (2013.01)

(58) Field of Classification Search
CPC ............................... G01C 25/00; G01C 25/005
USPC ................. 702/92, 96; 73/1.77, 1.79, 504.02, 73/504.13; 33/302, 304; 74/5.37; 331/10, 331/17
See application file for complete search history.

(56) References Cited

U.S. PATENT DOCUMENTS 4,258,579 A * 3/1981 Olbrechts .............. G01C 19/04 331/10

(Continued)

FOREIGN PATENT DOCUMENTS

WO 2008068542 A1 6/2008
WO 2008122904 A2 10/2008

(Continued)

OTHER PUBLICATIONS

Besancon, Remarks on Nonlinear Adaptive Observer Design, Systems & Control Letters, 2000, 41(4):271-280.

(Continued)

*Primary Examiner* — Carol S Tsai
(74) *Attorney, Agent, or Firm* — Quarles & Brady LLP

(57) ABSTRACT

A system and method for determining errors and calibrating to correct errors associated with field sensors, including bias, scale, and orthogonality, includes receiving and providing to a processor angular rate data and a first field vector relative to a first reference directional field and a second field vector relative to a second reference field from at least one field sensor. The processor is configured to relate the first field vector and the second field vector to the angular rate data to determine an error of the at least one field sensor. The processor is also configured to identify a compensation for the error of the at lease one field sensor needed to correct the first field vector and the second field vector and repeat the preceding to identify changes in the error over time and compensate for the changes in the error over time.

21 Claims, 2 Drawing Sheets

(56) References Cited

U.S. PATENT DOCUMENTS

| | | | | |
|---|---|---|---|---|
| 4,433,491 | A * | 2/1984 | Ott | E21B 47/022 33/302 |
| 4,559,713 | A * | 12/1985 | Ott | E21B 47/022 33/302 |
| 5,645,077 | A * | 7/1997 | Foxlin | A61B 5/1114 600/587 |
| 5,807,284 | A * | 9/1998 | Foxlin | A61B 5/1114 128/897 |
| 6,162,191 | A * | 12/2000 | Foxlin | A61B 5/1114 128/897 |
| 6,361,507 | B1 * | 3/2002 | Foxlin | A61B 5/1114 600/595 |
| 6,668,465 | B2 * | 12/2003 | Noureldin | G01C 21/16 175/45 |
| 6,786,877 | B2 * | 9/2004 | Foxlin | A61B 5/1114 600/587 |
| 6,823,602 | B2 * | 11/2004 | Noureldin | G01C 21/16 175/45 |
| 7,912,664 | B2 * | 3/2011 | Rozelle | G01C 19/5691 702/104 |
| 8,326,533 | B2 | 12/2012 | Sachs et al. | |
| 8,756,001 | B2 * | 6/2014 | Georgy | G01C 21/165 340/995.28 |
| 8,915,116 | B2 * | 12/2014 | Stanley | G01C 25/005 73/1.77 |
| 2002/0023192 | A1 * | 2/2002 | Mann | G01F 12/0684 711/105 |
| 2010/0063763 | A1 * | 3/2010 | Rozelle | G01C 19/5691 702/92 |
| 2012/0116716 | A1 | 5/2012 | Lokshin et al. | |
| 2012/0221244 | A1 * | 8/2012 | Georgy | G01C 21/165 701/472 |
| 2012/0259572 | A1 * | 10/2012 | Afzal | G01C 21/165 702/92 |
| 2013/0217998 | A1 * | 8/2013 | Mahfouz | A61B 5/4528 600/409 |
| 2014/0202229 | A1 * | 7/2014 | Stanley | G01C 25/005 73/1.79 |
| 2015/0039220 | A1 * | 2/2015 | Georgy | G01C 2/165 701/400 |

FOREIGN PATENT DOCUMENTS

| | | |
|---|---|---|
| WO | 2012064776 A2 | 5/2012 |
| WO | 2012135960 A1 | 10/2012 |

OTHER PUBLICATIONS

Liu, et al., Quaternion-based Algorithm for Orientation Estimation from MARG Sensors, J. Tsinghua Univ. (Sci. & Tech.), 2012, 52(5):627-631.

Soken, et al., UKF Based On-Orbit Gyro and Magnetometer Bias Estimation as a Part of the Attitude Determination Procedure for a Small Satellite, 11th International Conference on Control, Automation and Systems, Oct. 26-29, 2011, in Kintex, Gyeonggi-do, Korea, pp. 1891-1896.

Yamato, et al., Spatial Attitude Determination Framework by Globally and Asymptotically Stable Estimation of Gyroscope Bias Error with Disturbance Attenuation and Rejection, Transactions of The Japan Society of Mechanical Engineers, 2011, pp. 1441-1453.

* cited by examiner

SYSTEM AND METHOD FOR DETERMINING AND CORRECTING FIELD SENSORS ERRORS

STATEMENT REGARDING FEDERALLY SPONSORED RESEARCH

This invention was made with government support under 0812138 awarded by the National Science Foundation. The government has certain rights in the invention.

CROSS-REFERENCE TO RELATED APPLICATIONS

N/A

BACKGROUND OF THE INVENTION

The present invention relates to systems and methods for correcting errors, such as bias, and error changes in field sensors. More particularly, the invention relates to systems and methods for determining errors or bias and changes in errors or bias of field sensors, such as magnetometers and accelerometers, using angular rate data.

Magnetometers (or compasses), accelerometers, and gyroscopes are widely used in many applications including vehicle navigation systems and in electronics devices such as so-called smart-phones, mobile computing devices including tablets, and an ever-increasing range of systems. Magnetometers are used to measure Earth's local magnetic field vector with respect to the magnetometer device coordinate frame. Accelerometers are used to measure the device's total acceleration vector with respect to the device's coordinate frame, the total acceleration being the sum two components: a first component due to the local gravity field vector, and a second component due to the translational acceleration vector of the device with respect to an inertial coordinate frame. Often data from magnetometers and accelerometers are employed together to estimate the "full attitude" of the combined system or the aggregate device with which the sensors are associated, which typically includes determination of the heading, pitch, and roll of the device with respect to a frame defined jointly by the local gravity vector and the local magnetic field vector. Gyroscopes measure the angular rotation rate of the device with respect to the device coordinate frame. Many systems also incorporate gyroscopes combined with accelerometers and magnetometers to enable improved estimation of the "full attitude" of the system.

However, all these sensors can be affected by biases, scale factors, and non-orthogonality of their measurements. Therefore, sensor calibration to offset biases is valuable for accurate performance of attitude estimation of the system. Traditional mechanisms for trying to measure and calibrating against sensor bias include calculating the mean of the maximum value, $S_{max}$, and minimum value, $S_{min}$, of the measurements to estimate the sensor bias using the following equation:

$$\text{bias}=(S_{max}+S_{min})*0.5 \quad (1);$$

where $\text{bias}=[\text{bias}_x, \text{bias}_y, \text{bias}_z]$.

An alternative solution to calibrate sensor bias is based on a least squares method to fit the data to a sphere as follows:

$$(S_x-\text{bias}_x)^2+(S_y-\text{bias}_y)^2+(S_z-\text{bias}_z)^2=R^2, \quad (2);$$

where $S_x$, $S_y$, and $S_z$ are the magnitudes of the X, Y, and Z sensor measurements and $R^2$ is the magnitude of the magnetic field vector squared. Conventionally, equation (2) is solved for $\text{bias}=[\text{bias}_x, \text{bias}_y, \text{bias}_z]^T$. Unfortunately, these methods require large movements to measure a large angular range of outputs from the sensor. In general, 360 degree movement of the device/system is required in one or several degrees of freedom (e.g. a figure-eight pattern movement.)

Furthermore, sensor bias may change over time. Such methods for determining sensor bias are precluded from addressing sensor bias that may vary over time or with changes in operating conditions. Furthermore, changes in sensor bias over time or in response to changes in operating conditions can only be addressed by such calibration methods by recalibrating the device upon recognizing a change in sensor bias. Unfortunately, such calibration methods do not easily provide a way to identify changes in sensor bias without performing a full recalibration of sensor bias. Accordingly, such methods are ill suited to address changes in sensor bias over time or in response to changes in operating conditions.

Other traditional mechanisms for trying to calibrate against sensor bias, specifically compass bias, are accomplished by performing a series of small movements of the device/system and comparing the data from the compass/magnetometer with rotational data calculated by numerically integrating gyroscope data in three dimensions from a start position to an end position. This approach, however, requires numerical integration of the gyroscope data, which can be computationally intensive, particularly for systems without excess processing power. Furthermore, such approaches cannot continuously calculate sensor bias. This approach is often limited to compass bias calibration and, because the approach relies on numerical integration, it is inherently limited in the calibration process.

Therefore, there is a need for systems and methods robust determination of sensor bias over a range of conditions and times and to compensate or correct for determined sensor bias across the range of conditions and times.

SUMMARY OF THE INVENTION

The present invention overcomes the aforementioned drawbacks by providing systems and methods that can continuously determine and correct or compensate for sensor error of field sensors, such as magnetometers and accelerometers. In particular, the present invention can use angular rate data obtained, for example, from a gyroscope and relate it to the sensor measurement rates to continually or periodically estimate and correct sensor error.

In accordance with one aspect of the invention, a system is disclosed for determining an error of a field sensor includes an input configured to receive angular rate data from a gyroscope and at least one of a first field vector relative to a first reference directional field and a second field vector relative to a second reference field from at least one field sensor. The system also includes a non-transitive computer-readable storage medium having stored thereon instructions and a processor configured to receive the angular rate data and the at least one of the first field vector and the second field vector. The processor is configured to access the storage medium to execute the instructions to carry out steps of i) relating the at least one of the first field vector and the second field vector to the angular rate data to determine an error of the at least one field sensor providing the at least one of the first field vector and the second field vector. The processor is further configured to carry out the steps of ii) identifying a compensation for the error of the at least one field sensor needed to correct the at least one of the first field vector and the second field vector and iii) repeating steps i) and ii) to identify changes in the error over time and compensate for the changes in the error over time.

In accordance with another aspect of the invention, a non-transitive computer-readable storage medium is disclosed having stored thereon instructions that when executed by a processor cause the processor to receive input data (x(t)) from a field sensor and angular rate data (w(t)) from a gyroscope. The processor is further caused to relate the input data to the angular rate data to determine a bias (b) of the field sensor providing inputs and estimate the sensor bias using the following equation $\dot{x}(t)=-w(t) \times (x(t)-b)$, where $\times$ is a standard cross product operator and $\dot{x}(t)$ is the field sensor derivative term.

In accordance with yet another aspect of the invention, a method is disclosed for determining bias of a field sensor in real-time. The steps of the method include a) acquiring gyroscopic data providing angular rate data and at least one of a first directional vector relative to a reference direction and a second directional vector and b) relating the at least one of the first directional vector and the second directional vector to the angular rate data. The method also includes the steps of c) determining, using the relating of step b), a bias of the field sensor, d) correcting the at least one of the first directional vector and the second directional vector based on the bias, and f) repeating steps a) through d) periodically to determine and correct changes in the bias between repetitions of steps a) through d).

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

As discussed, three-axis magnetometers, three-axis accelerometers, and other field sensors are widely used sensors for attitude estimation, yet suffer from limited accuracy because of sensor measurement errors. As will be described, a system and method for estimating the sensor errors of a multi-axis field sensors, such as magnetometers and accelerometers. Multi-axis angular velocity measurements, such as may be provided by an angular-rate gyroscope, can be used to estimate the multi-axis field sensor measurement error and, based thereon, correct for such errors. These systems and methods do not require knowledge of the direction of the field (e.g. the local magnetic field or the local gravitational field) or the attitude of the device associated with the sensor, but can ensure convergence for the estimated parameters.

Figure 1:
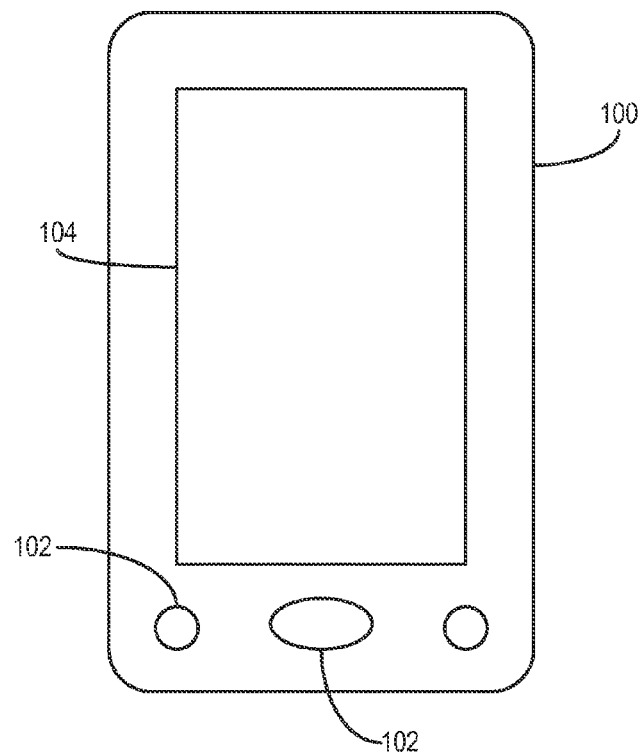
FIG. 1 illustrates an example of one device in which the present invention can be implemented.

Referring particularly now to FIG. 1, an exemplary device 100 is shown. The device 100 may be, for example, a mobile device, such as vehicle navigation system (which may or may not be integrated with the vehicle), a personal electronics device, such as a smart-phone or a tablet device, or other device that may benefit from an attitude sensor. The device 100 may include various user interfaces, such as buttons 102 that facilitate a user to manipulate the device 100 and a user communication device, such as a display 104. As will be described, the display 104 may be designed to provide the user with data regarding estimated and corrected sensor errors, such as bias in the data provided by the sensor and/or errors created by scale factors due to system changes, and/or errors related to orthogonality. With respect to scale and orthogonality, the error terms may be formed as 3×3 matrix in addition to bias.

Figure 2:
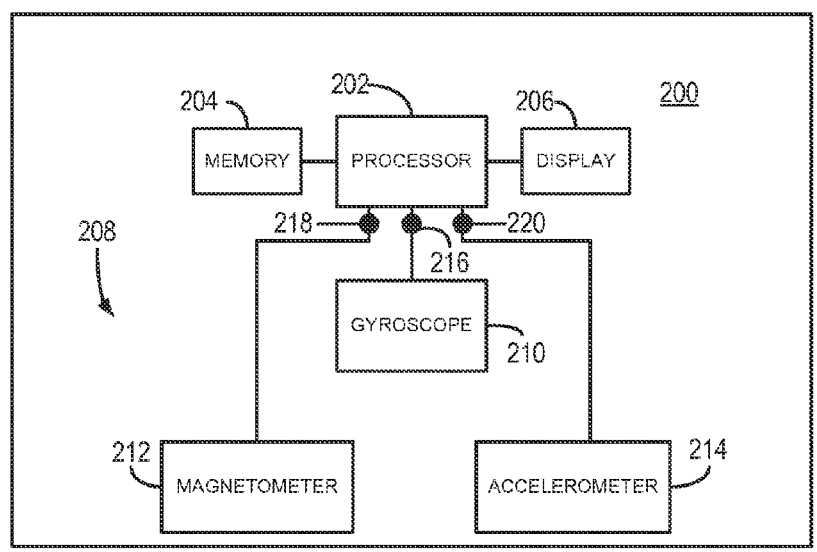
FIG. 2 is a diagram of an example of one architecture for implementing the present invention that forms part of the device of FIG. 1.

Referring to FIG. 2 a processing architecture 200 is illustrated that, for example, may be integrated into the device 100 of FIG. 1. The processing architecture 200 may include a processor 202 and a memory 204 that is accessible by the processor 202 and can store datasets, such as the estimated and corrected errors, and/or operational instructions for the processor. The architecture 200 also includes a display 206, which if integrated into the device of FIG. 1 may be represented in FIG. 1 by the display 104. The display 206 may be coupled to the processor 202 to communicate, for example, reports, images, or other information to the user. The architecture 200 may also include a plurality of sensors 208 that individually or together form a sensor system that provides data to the processor 202. The plurality of sensors 208 may include a gyroscope 210, a magnetometer 212, and an accelerometer 214. The gyroscope 210 may be an "angular-rate gyroscope" that measures the 3-Axis rate of rotation of the device 100. The magnetometer 212 and the accelerometer 214 may be referred to as, for example, attitude sensors or field sensors. More generally, the present invention is useful with locally uniform field sensors, which may include magnetometers and accelerometers, as well as other sensors, such as electric field sensors and others. The gyroscope 210 may provide gyroscopic data, such as angular rate data, to an input 216 coupled to the processor 202. The magnetometer 212 may provide inertial measurement data, such as a reference direction (e.g., the local magnetic field vector), and sensor measurement data in the device coordinate frame, such as a directional vector, to an input 218 coupled to the processor 202. The accelerometer 214 may provide inertial measurement data, such as a gravitational reference (e.g. the local gravity field vector), and sensor measurement data in the device coordinate frame, such as a directional vector, to an input 220 coupled to the processor 202. The data provided to inputs 216, 218, and 220 may be stored in the memory 204 so that the processor 202 can later access it.

As described, three-axis magnetometers and accelerometers are widely used in navigation applications and consumer electronics devices. Measurements from these sensors are subject to systematic errors due to sensor bias, scale factor and (lack of) orthogonality. In a traditional model for sensing bias, the inertial measurement data and the sensor measurement data are related, for example, by a mathematical relationship, such as provided by the following equation:

$$x_0 = R(t)(x(t)-b), \quad (3);$$

where $x_0$ is the inertial measurement data in the inertial reference frame, x(t) is the sensor measurement data in the device reference frame, b is the unknown feedback bias to be estimated, R(t) is a 3×3 rotation matrix relating the device reference frame to the inertial reference frame.

In many practical cases, however, such as the case of the ubiquitous micro-electro-mechanical systems (MEMS) inertial measurement units (IMUs) that are widely used in vehicle navigation systems, R(t) is not directly instrumented. Thus, the calibration solution is not applicable for these devices. MEMS IMUs are typically equipped with a 3-axis magnetometer, a 3-axis accelerometer, a 3-axis angular-rate gyroscope, and a temperature sensor.

Figure 3:
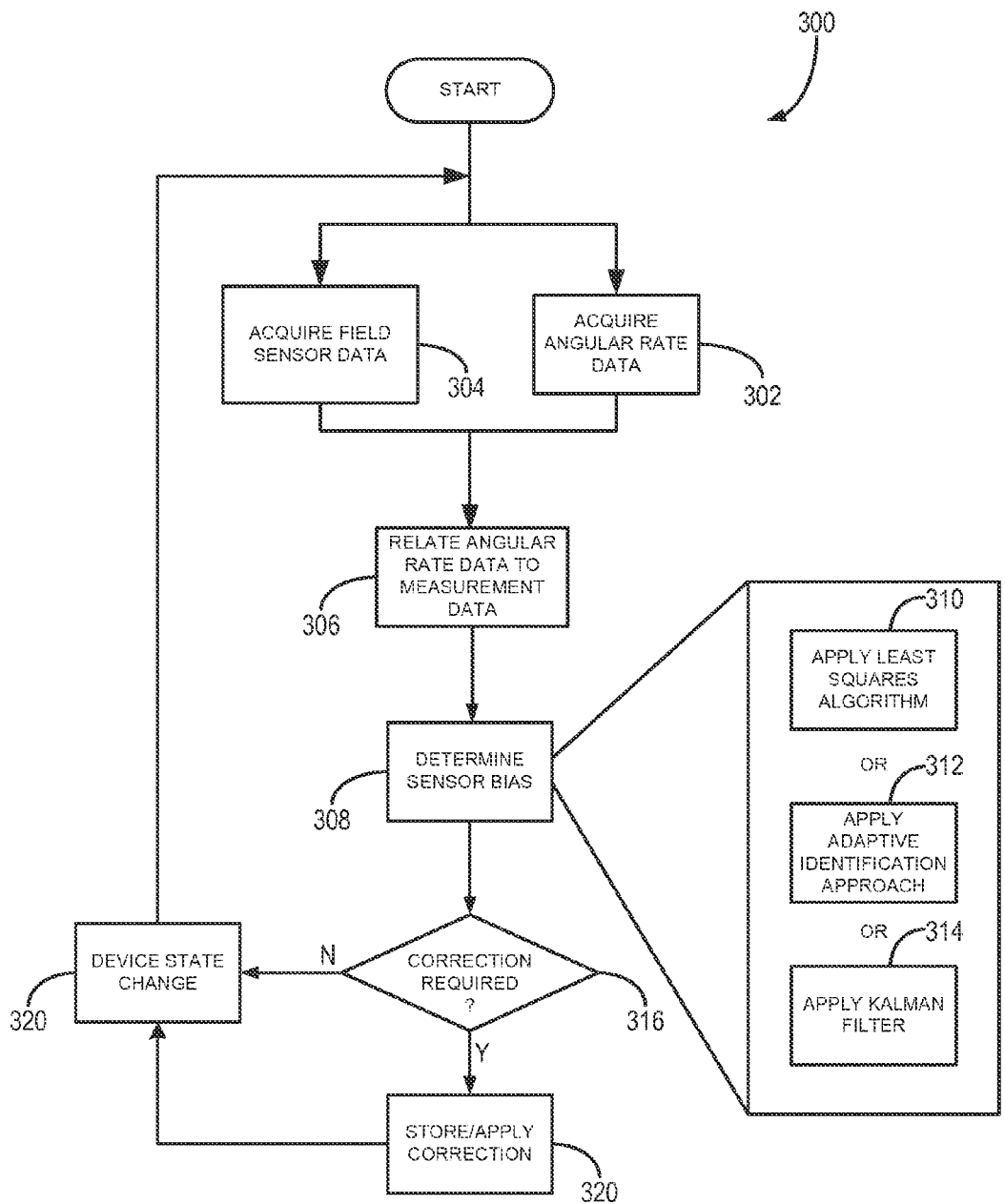
FIG. 3 is a flow chart setting forth the steps of a method in accordance with the present invention.

Referring now to FIG. 3, a flow chart setting forth exemplary steps 300 for determining the bias of an attitude sensor is provided. The process starts at process block 302 with the acquisition of angular rate data from, for example, an angular rate gyroscope. In parallel with or, in some instances, in serial with, process block 302, field sensor measurement data is then acquired at process block 304. As previously discussed, the field measurement data can be, for example, a reference direction or a gravitation reference, produced by a field sensor, such as an accelerometer, in the device reference frame. The sensor measurement data may also include, for example, a magnetic field vector, obtained from a field sensor, such as magnetometer, in the device reference frame. Both the field sensor data may be provided to the processor 202 of FIG. 2 through respective or a common input.

At process block 306, the angular rate data, such as from the gyroscopic data, is related to the sensor measurement data. For example, a relationship between the angular rate data and the field sensor measurement data can be expressed in the following equation:

$$\dot{x}(t) = -w(t) \times (x(t) - b),\quad (4);$$

where $w(t)$ is the angular rate data, × is a standard cross product operator, and $\dot{x}(t)$ is the field sensor derivative term. Other relationships may also be used. For example:

$$S_b \dot{x}(t) = -w(t) \times (S_b x(t) - b)\quad (5);$$

where $S_b$ is a 3×3 sensor scale and orthogonality matrix.

Using, for example, equation (4) or equation (5), the bias of the sensor can be determined at process block 308. As described above, such a sensor may be integrated into a device including the architecture of FIG. 2 or other architecture for implementing the method of FIG. 3.

There are several methods that may be used to solve equation (4) for the unknown bias (b) and solve equation (5) for the unknown bias (b) and the sensor scale and orthogonality matrix ($S_b$). For example, one method includes, but is not limited to, applying a least square algorithm, as shown at process block 310. The least squares algorithm is particularly useful for solving either equation (4) or equation (5). There are other methods that may also be used. For example, an adaptive identification approach, as shown at process block 312, or a Kalman filter, as shown at process block 314 may also be used. If applying the least squares algorithm, as shown at process block 310, the angular rate data, the inertial measurement data, and the sensor measurement data may be low-pass filtered prior to the least squares estimation. However, applying the Kalman filter or the adaptive identification approach, as shown at process block 312 or 314, advantageously does not require numerically differentiation sensor measurement ($\dot{x}(t)$).

Thus, the unknown sensor bias, b, can be estimated with linear least squares estimation. The sum of squared residuals cost function is:

$$SSR(b) = \sum_{i=1}^{n} \frac{1}{\sigma_i^2} |\dot{x}_i + \omega_i \times (x_i - b)|^2;\quad (6)$$

Where $\sigma_i$ is variance of the measurement, and each measurement is the discrete sample of the measurements (e.g., $x_i$ represents a discrete-time sampling of x(t)). The linear least squares estimate for b is given by:

$$\hat{b} = \underset{b \in \mathbb{R}^3}{\operatorname{argmin}} SSR(b) \quad (7)$$

$$= \left( \sum_{i=1}^{n} \frac{1}{\sigma_i^2} W_i^2 \right)^{-1} \left( \sum_{i=1}^{n} \frac{1}{\sigma_i^2} W_i y_i \right);$$

where $W_i \in \mathbb{R}^{3 \times 3}$ is the skew-symmetric matrix from the measurements $\omega_i$, $W_i = S(\omega_i)$, and $y_i \in \mathbb{R}^3$ is the calculated vector from the measurements, $y_i = \dot{x}_i + \omega_i \times x_i$. The solution to equation (7) exists when the set of measured angular velocity vectors, $[\omega_1, \omega_2, \ldots \omega_n]$ are not all collinear, in consequence, $$\left( \sum_{i=1}^{n} W_i^2 \right)$$

is invertible.

The signal $\dot{x}(t)$ may not directly instrumented in magnetometers and accelerometers, and thus this approach may use (possibly noisy) numerical differentiation of the sensor measurement x(t).

As stated, a Kalman filter may also be used. For example, equation (4) can be rewritten as:

$$\underbrace{\begin{bmatrix} \dot{x} \\ \dot{b} \end{bmatrix}}_{\Phi} = \underbrace{\begin{bmatrix} -S(\omega) & S(\omega) \\ 0 & 0 \end{bmatrix}}_{A(t)} \underbrace{\begin{bmatrix} x \\ b \end{bmatrix}}_{\Phi};\quad (8)$$

with the measurement model:

$$z = \begin{bmatrix} I & 0 \\ & H \end{bmatrix} \begin{bmatrix} x \\ b \end{bmatrix}.\quad (9)$$

The following time-varying system can be defined as:

$$\dot{\Phi}(t) = A(t)\Phi(t) + v_1(t), v_1(t) \sim N(0, Q),$$

$$z = H\Phi + v_2(t), v_2(t) \sim N(0, R),\quad (10).$$

After a discretization of the continuous-time system, the sensor bias estimation can be solved with a standard discrete time Kalman filtering implementation. Notably, there are Kalman filtering implementations that do not require differentiation.

Also, with respect to the adaptive identification for sensor bias compensation, an advantage with the adaptive approach is that it does not require numerical differentiation of the sensor measurement x(t).

There are a variety of similar, but distinctly different adaptive algorithms for solving for the unknowns b and $S_b$. Consider the following adaptive observer for the plant of the form of equation (5), which is but one example of the variety of options that may be used with the present invention:

$$\dot{\hat{x}}(t) = -\omega(t) \times (\hat{x}(t) - \hat{b}) - k_1 \Delta x, \hat{x}(0) = x_0$$

$$\dot{\hat{b}}(t) = k_2(\omega \times \Delta x)\hat{b}(0) = \hat{b}_0 \quad (11);$$

where estimation errors are defined as:

$$\Delta x(t) = \hat{x}(t) - x(t), \Delta b(t) = \hat{b}(t) - b \quad (12).$$

Given the measured angular-rate signal, ω(t), and biased multi-axis field sensor measurement, x(t), our goal is to construct an estimate of b̂(t) of the unknown sensor bias parameter b such that: 1) all signals remain bounded, and 2) b̂(t) converge asymptotically to b. That is, $\lim_{t\to\infty}\Delta b(t)=0$.

Before deriving the adaptive identifier, some results required later are reviewed; notably, however, this is but one set of results that may be used to address deriving the adaptive identifier all of which are within the scope of the present disclosure:

Definition 1 (Persistent Excitation (PE)). A matrix function $W: \mathbb{R}^+ \to \mathbb{R}^{m\times m}$ is persistently exciting (PE) if there exist T, $\alpha_1, \alpha_2 > 0$ such that for all $t \geq 0$:

$$\alpha_1 I_m \geq \int_t^{t+T} W(t) W^T(\tau) d\tau \geq \alpha_2 I_m \quad (13);$$

where $I_m \in \mathbb{R}^{m\times m}$ is the identity matrix.

Lemma 1 (Barbalat's Lemma). Let $\phi: \mathbb{R} \to \mathbb{R}$ be a uniformly continuous function on $[0,\infty)$. Suppose that $\lim_{t\to\infty}\int_0^t \phi(\tau)d\tau$ exists and is finite. Then, $\phi(t) \to 0$ as $t \to \infty$.

We assume the following:

Assumption 1. There exist two positive constants $\bar{c}_1, \bar{c}_2, \bar{c}_3$ and $\bar{c}_4$ such that $\forall(t): |\omega(t)| \leq \bar{c}_1, |\dot\omega(t)| \leq \bar{c}_2, |x(t)| \leq \bar{c}_3$, and $|\dot x(t)| \leq \bar{c}_4$.

We can now state the main result for the adaptive identifier.

Theorem 1 (Sensor Bias Observer). Consider the system represented by equation (5) with time-varying ω(t) and x(t). Let (x̂, b̂) denote the solution to equation (11) with $k_1, k_2 > 0$ positive gains, and ω(t) satisfying the Assumption 1, and PE as defined in Definition 1. Then the equilibrium $(\Delta x, \Delta b) = (0, 0)$ of equation (11) is globally asymptotically stable.

Proof: From equation (11) and the estimation errors definition of equation (12), the error system is:

$$\Delta\dot{x}(t) = -\omega(t) \times (\Delta x(t) - \Delta b) - k_1 \Delta x$$

$$\Delta\dot{b}(t) = -k_2(\omega \times \Delta x) \quad (14);$$

Consider the Lyapunov candidate function:

$$L = \frac{1}{2}\|\Delta x\|^2 + \frac{1}{2k_2}\|\Delta b\|^2; \quad (15)$$

where L is a smooth positive definite, and radially unbounded function by construction. Taking the time derivative and recalling equation (14) yields:

$$\frac{d}{dt}L = \Delta x^T[-\omega \times (\Delta x - \Delta b) + k_1 \Delta x] + \Delta b^T(\omega \times \Delta x) \quad (16)$$

$$= -k_1|\Delta x|^2 \leq 0;$$

The time derivative of this Lyapunov function is negative semi-definite and, thus, the system is globally stable. Given that the Lyapunov function of equation (15) is bounded below by 0 and, in consequence of equation (16) is bounded above by its initial value, $L_{t0}$, and since equation (15) is a radially unbounded function of $\Delta x(t)$ and $\Delta b$, $\Delta x(t)$ and $\Delta b$ are bounded. For any t, we have $$\int_0^t |\Delta x(\tau)|^2 d\tau \leq \frac{1}{k_1} L_{t0},$$

then $\Delta x(t) \in L^2$. Thus from Barbalat's lemma, we can prove globally asymptotically stability for $\Delta x(t)$. If $\Delta x(t) \to 0$ then, $\Delta b(t) \to 0$ as $t \to \infty$, but extra results are needed to prove asymptotically stability for $\Delta b(t)$. Since by assumption ω(t) is PE and using lemma A.1 from G. Besancon, Remarks on nonlinear adaptive observer design. Systems and Control Letters, 41(4):271-280, 2000, which is incorporated herein by reference, global asymptotically stability for $\Delta b(t)$. Notably, the above several techniques, which are shown to solve for "b", can also be generalized to solve for either or both of $S_b$ and b and are within the scope of the present disclosure.

Referring again to FIG. 3, using the bias determined using, for example, one of the methods described above, a check is performed at decision block 316 to determine if a correction for the bias is necessary or desired. If so, at process block 318, a compensation or correction, such as a correction value, may be stored or applied.

Unlike traditional systems and methods for determining sensor bias and allowing for system calibration to offset or overcome the bias, the present method can provide real-time or periodic correction for sensor bias. This stands in contrast to the one-time or, at best, user re-initiated calibration processes. Instead, the systems and methods of the present invention can periodically, continually, or upon request, reevaluate sensor bias, such as following a device state change, such as indicated at process block 320. A device state change may include the passage of a predetermined or, for that matter, a de minimis amount of time, a conditional or damage or shock condition experienced by the system or the like. Regardless of the particulars of the device state change at process block 320, the above-described process can be reiterated, without onerous user interaction or even user prompting or knowledge to identify potential or actual changes in sensor bias and apply updated corrections or compensations.

Thus, the above-described system and method used allows angular rate data obtained from, for example, a gyroscope or other angular-rate sensor, to continually or periodically estimate and correct field sensor bias. The field sensor may be, for example, a magnetometer or and accelerometer, as previously discussed. The above-described system and method also does not require integration of the gyroscope data, is not limited to handheld devices and is not constrained to a specific set of movements required to operate.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for determining an error of a field sensor, the system comprising:
    an input configured to receive angular rate data from a gyroscope and at least one of a first field vector relative to a first reference directional field and a second field vector relative to a second reference field from at least one field sensor;
    a non-transitive computer-readable storage medium having stored thereon instructions;
    a processor configured to receive the angular rate data and the at least one of the first field vector and the second field vector and access the storage medium to execute the instructions to carry out steps of:
        i) relating the at least one of the first field vector and the second field vector to the angular rate data to determine an error of the at least one field sensor providing the at least one of the first field vector and the second field vector;

ii) identifying a compensation for the error of the at least one field sensor needed to correct the at least one of the first field vector and the second field vector; and iii) repeating steps i) and ii) to identify changes in the error over time and compensate for the changes in the error over time.

2. The system as recited in claim 1 wherein the at least one field sensor includes at least one of a magnetometer and an accelerometer.

3. The system as recited in claim 1 wherein the processor is further configured to continually measure error of the at least one field sensor.

4. The system as recited in claim 1 wherein step ii) includes generating compensating values and using the compensation values to compensate for the error of the at least one field sensor.

5. The system as recited in claim 4 wherein the processor is further configured to store the compensating values on the non-transitive computer-readable storage medium.

6. The system as recited in claim 1 wherein the processor is further configured to determine at least one of a heading angle of rotation, a pitch angle of rotation, and a roll angle of rotation using data received from the at least one field sensor and compensating for the error corrects for errors in the at least one of a heading angle of rotation, a pitch angle of rotation, and a roll angle of rotation caused by the error.

7. The system as recited in claim 1 wherein the processor is further configured to facilitate execution of the instructions to estimate sensor error with at least one of the following equations:

$$\dot{x}(t) = -w(t) \times (x(t) - b) \text{ and}$$

$$S_b \dot{x}(t) = -w(t) \times (S_b x(t) - b),$$

where w(t) is the angular rate data, x is a standard cross product operator, $\dot{x}(t)$ is the attitude sensor derivative term, b is the error, and $S_b$ is a sensor scale and orthogonality matrix.

8. The system as recited in claim 1 wherein the processor is further configured to correct the at least one field sensor using at least one of a least squares algorithm, an adaptive identification approach, and a Kalman filter.

9. A non-transitive computer-readable storage medium having stored thereon instructions that when executed by a processor cause the processor to:

receive input data (x(t)) from a field sensor and angular rate data (w(t)) from a gyroscope;

relate the input data to the angular rate data to determine a bias (b) of the field sensor providing inputs; and estimate the sensor bias using the following equation:

$$\dot{x}(t) = -w(t) \times (x(t) - b),$$

where x is a standard cross product operator and $\dot{x}(t)$ is the field sensor derivative term.

10. The system as recited in claim 9 wherein the input data includes gyroscopic data providing the angular rate data and the first field vector is relative to a reference direction and the second field vector is relative to a gravitational reference.

11. The system as recited in claim 9 wherein the field sensor includes at least one of a magnetometer and an accelerometer.

12. The system as recited in claim 9 wherein the processor is further configured to continually estimate bias of the field sensor.

13. The system as recited in claim 9 wherein the processor is further caused to calculate at least one of a heading angle of rotation, a pitch angle of rotation, and a roll angle of rotation of the field sensor and the bias influences calculations of the at least one of the heading angle of rotation, the pitch angle of rotation, and the roll angle of rotation based on data from the field sensor.

14. The system as recited in claim 9 wherein the processor is further configured to correct the field sensor using at least one of a least squares algorithm, an adaptive identification approach, and a Kalman filter.

15. A non-transitive computer-readable storage medium having stored thereon instructions that when executed by a processor cause the processor to:

a) acquiring gyroscopic data providing angular rate data and at least one of a first directional vector relative to a reference direction and a second directional vector;

b) relating the at least one of the first directional vector and the second directional vector to the angular rate data;

c) determining, using the relating of step b), a bias of the field sensor;

d) correcting the at least one of the first directional vector and the second directional vector based on the bias; and f) repeating steps a) through d) periodically to determine and correct changes in the bias between repetitions of steps a) through d).

16. The system as recited in claim 15 wherein the field sensor is at least one of a magnetometer and an accelerometer.

17. The system as recited in claim 15 further comprising determining at least one of a heading angle of rotation, a pitch angle of rotation, and a roll angle of rotation and wherein step f) is performed to correct for the bias influencing the at least one of a heading angle of rotation, a pitch angle of rotation, and a roll angle of rotation.

18. The system as recited in claim 15 wherein step d) includes further estimating the bias using at least one of a least squares algorithm, an adaptive identification approach, and a Kalman filter.

19. The system as recited in claim 15 wherein step d) includes estimating the bias with the following equation:

$$\dot{x}(t) = -w(t) \times (x(t) - b),$$

where w(t) is the angular rate data, x is a standard cross product operator, and $\dot{x}(t)$ is the field sensor derivative term.

20. The system as recited in claim 15 wherein step d) includes estimating the bias with the following equation:

$$S_b \dot{x}(t) = -w(t) \times (S_b x(t) - b)$$

where w(t) is the angular rate data, x is a standard cross product operator, $\dot{x}(t)$ is the field sensor derivative term, and $S_b$ is a sensor scale and orthogonality matrix.

21. The system of claim 20 wherein $S_b$ relates to at least one of orthogonality and scale factor.

* * * * *